(12) United States Patent
Peretz et al.

(10) Patent No.: US 9,411,811 B2
(45) Date of Patent: Aug. 9, 2016

(54) COORDINATED POINT-IN-TIME SNAPSHOTS OF MULTIPLE COMPUTING PLATFORMS

(71) Applicant: INTERNATIONAL BUSINESS MACHINES CORPORATION, Armonk, NY (US)

(72) Inventors: Ofer Peretz, Haifa (IL); Yaron Kraus, Haifa (IL); Asaf Yeger, Kiryat-Tivon (IL)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 14/147,651

(22) Filed: Jan. 6, 2014

(65) Prior Publication Data

US 2015/0193454 A1    Jul. 9, 2015

(51) Int. Cl.
*G06F 17/30* (2006.01)
*G06F 11/14* (2006.01)

(52) U.S. Cl.
CPC ...... *G06F 17/30088* (2013.01); *G06F 11/1464* (2013.01); *G06F 17/302* (2013.01)

(58) Field of Classification Search
CPC ................................................. G06F 17/30088
See application file for complete search history.

(56) References Cited

U.S. PATENT DOCUMENTS

| 8,234,469 B2 | 7/2012 | Ranade |
| 8,417,907 B2 | 4/2013 | Urkude et al. |
| 2007/0006018 A1* | 1/2007 | Thompson .......... G06F 11/1466 714/6.12 |
| 2012/0023068 A1 | 1/2012 | Elrom et al. |
| 2012/0331247 A1* | 12/2012 | Hoobler, III ........ G06F 11/1458 711/162 |
| 2013/0054529 A1* | 2/2013 | Wang .................. G06F 11/1448 707/639 |
| 2013/0166863 A1 | 6/2013 | Buragohain et al. |
| 2013/0339643 A1* | 12/2013 | Tekade ............. G06F 17/30581 711/162 |

FOREIGN PATENT DOCUMENTS

EP    2033100 B1    5/2013

OTHER PUBLICATIONS

Stender et al. "Loosely Time-Synchronized Snapshots in Object-Based File Systems", IEEE 29th International Performance Computing and Communications Conference (IPCCC), 2010, pp. 188-197.
Yang et al., "ST-CDP: Snapshots in TRAP for Continuous Data Protection". IEEE Transactions on computers, vol. 61, No. 6. Jun. 2012.

* cited by examiner

*Primary Examiner* — Apu Mofiz
*Assistant Examiner* — Cindy Nguyen
(74) *Attorney, Agent, or Firm* — Matthew C. Zehrer (57) ABSTRACT

Coordinating point-in-time snapshots among multiple computing platforms by receiving a notification from a first computing platform agent indicating a first computing platform snapshot time, receiving a notification from a second computing platform agent indicating a second computing platform snapshot time, determining that second computing platform snapshot time is later than the first computing platform snapshot time, notifying the first computing platform agent of the second computing platform snapshot time, and receiving from the first computing platform agent a report of any location in the first computing platform's data storage to which data were written after the first computing platform snapshot time and responsive to a write request that was made prior to or including the second computing platform snapshot time.

19 Claims, 6 Drawing Sheets

COORDINATED POINT-IN-TIME SNAPSHOTS OF MULTIPLE COMPUTING PLATFORMS

FIELD

Embodiments of the invention relate to controlling computer software processes in general, and more particularly to coordinating point-in-time snapshots among multiple computing platforms.

BACKGROUND

Conventional data backup techniques often involve periodically taking point-in-time (PIT) "snapshots" to preserve the state of data stored by computers and virtual machines that are hosted by computers. Typically, a snapshot identifies data storage locations to which data were written since the last data backup was performed or since the last snapshot was taken. Measures may be taken to prevent these data storage locations from being overwritten until a backup of their data is made.

Complex computing systems often involve multiple computer applications being executed on multiple computing platforms, where the applications share data among them. In such systems each computing platform typically manages its own data storage. Conventional data backup techniques as applied to such systems may require each computing platform to take its own snapshot of its own data storage. However, as data are shared between the applications, it may be critical to ensure that snapshots of the various computing platforms be taken at the same point in time in order to maintain data consistency between the applications. Unfortunately, the different computing platforms in such systems often require different amounts of time to create their snapshots.

SUMMARY

In one aspect of the invention a method is provided for coordinating point-in-time snapshots among multiple computing platforms, the method including receiving a notification from an agent on a first computing platform indicating a time when a snapshot of the first computing platform's data storage was performed, receiving a notification from an agent on a second computing platform indicating a time when a snapshot of the second computing platform's data storage was performed, determining that the time when the snapshot of the second computing platform's data storage was performed is later than the time when the snapshot of the first computing platform's data storage was performed, notifying the agent on the first computing platform of the time when the snapshot of the second computing platform's data storage was performed, and receiving from the agent on the first computing platform a report of any location in the first computing platform's data storage to which data were written after the time when the snapshot of the first computing platform's data storage was performed and responsive to a write request that was made prior to or including the time when the snapshot of the second computing platform's data storage was performed.

In another aspect of the invention a method is provided for coordinating point-in-time snapshots among multiple computing platforms, the method including performing a snapshot of a computing platform's data storage, reporting a time when the snapshot was performed, receiving a notification indicating that a snapshot synchronization time that is later than the time when the snapshot of the computing platform's data storage was performed, and reporting any location in the computing platform's data storage to which data were written after the time when the snapshot of the computing platform's data storage was performed and responsive to a write request that was made prior to or including the snapshot synchronization time.

In other aspects of the invention systems and computer program products embodying the invention are provided.

BRIEF DESCRIPTION OF THE DRAWINGS

Embodiments of the invention will be understood and appreciated more fully from the following detailed description taken in conjunction with the appended drawings in which.

DETAILED DESCRIPTION

Embodiments of the invention are now described, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
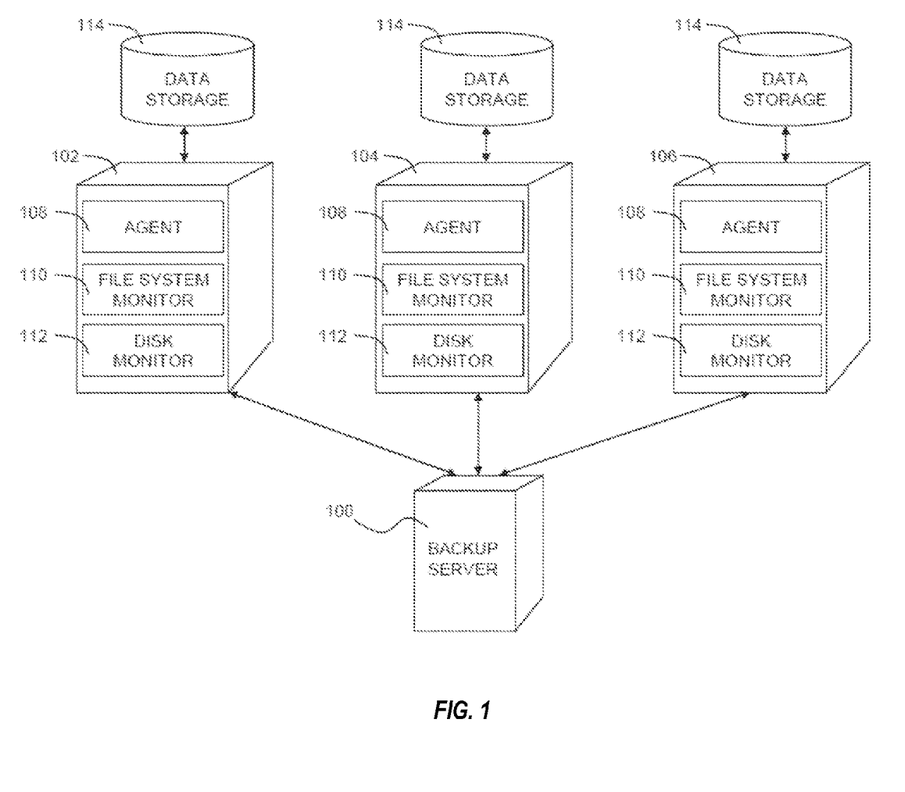
FIG. 1 is a simplified conceptual illustration of a system for coordinating point-in-time snapshots of multiple computing platforms, constructed and operative in accordance with an embodiment of the invention.

Reference is now made to FIG. 1 which is a simplified conceptual illustration of a system for coordinating point-in-time snapshots of multiple computing platforms, constructed and operative in accordance with an embodiment of the invention. In the system of FIG. 1 a backup server 100 is shown configured to communicate with computing platforms 102, 104, and 106, although it is appreciated that backup server 100 may be configured to communicate with any number of computing platforms. A computing platform as referred to herein may, for example, refer to a computer together with its operating system, a virtual machine that is hosted by a computer, or a hypervisor that is hosted by a computer and that manages multiple virtual machines that are themselves hosted by one or more computers, although the person of ordinary skill in the art to which the embodiments of the invention pertain will recognize that other combinations of computer hardware and software are contemplated in the context of the embodiments of the invention. Computing platforms 102, 104, and 106 are each preferably configured with an agent 108, a file system monitor 110, a disk monitor 112, and data storage 114, which may include one or more physical data storage devices or portions thereof.

Figure 2A:
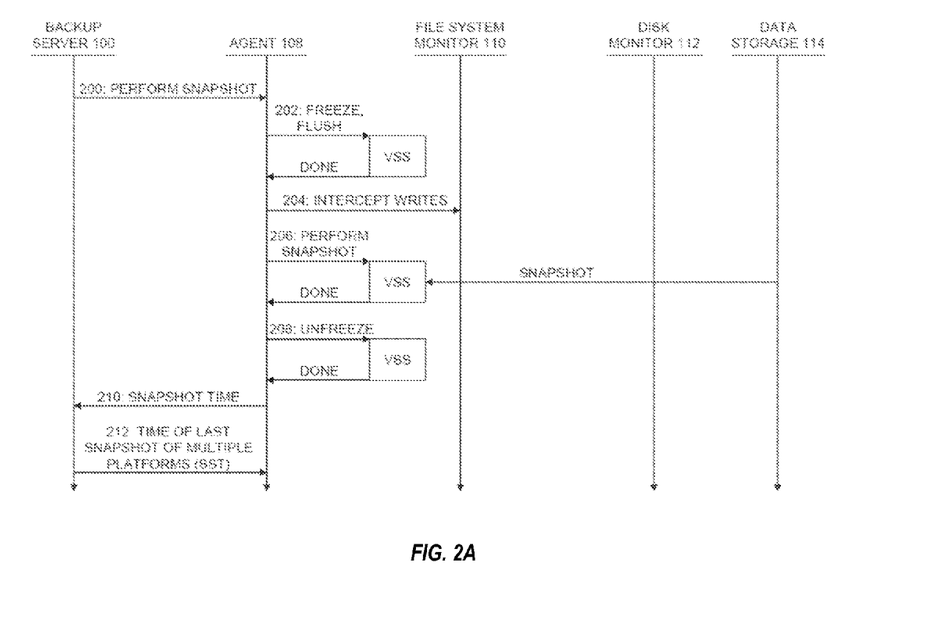
FIGS. 2A and 2B, taken together, is a simplified action diagram of an exemplary method of operation of the system of FIG. 1, operative in accordance with an embodiment of the invention.
Figure 2B:
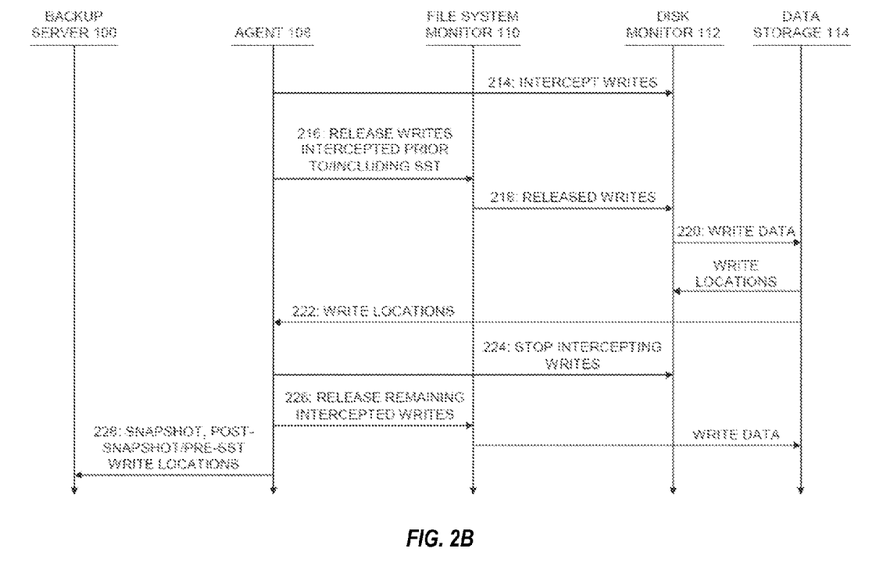

Additional reference is now made to FIGS. 2A and 2B which, taken together, is a simplified action diagram of an exemplary method of operation of the system of FIG. 1, operative in accordance with an embodiment of the invention. In this example references to agent 108, file system monitor 110, disk monitor 112, and data storage 114 may be understood to refer to any, and preferably each, of their instances on each of computing platforms 102, 104, and 106. In the method of FIGS. 2A and 2B backup server 100 instructs agent 108 to perform a snapshot of data storage 114 at or about a designated time (step 200), such as by instructing agent 108 to perform a backup operation which in turn causes agent 108 to perform the snapshot. Preferably, the current time as known to the operating systems on computing platforms 102, 104, and 106 is the same, such as where their internal clocks are synchronized in accordance with conventional techniques. At or about the designated time agent 108 instructs its computing platform's operating system or a component thereof, such as the Volume Shadow Service™ (VSS) where the operating system is Microsoft Windows™, to prepare to perform a snapshot of data storage 114, such as by performing freeze and flush operations in accordance with conventional techniques prior to performing the snapshot (step 202). After the freeze and flush operations have been completed, agent 108 instructs file system monitor 110 to intercept all requests on its computing platform to write data to files and record the time of each request, while preventing the data from being written to data storage 114 (step 204). Agent 108 then performs the snapshot of data storage 114 in accordance with conventional techniques, such as by instructing its computing platform's operating system or a component thereof, such as VSS, to perform the snapshot (step 206). After the snapshot has been completed, agent 108 instructs its computing platform's operating system or a component thereof, such as VSS, to perform an unfreeze, or thaw, operation in accordance with conventional techniques (step 208). Agent 108 then notifies backup server 100 of the time when the snapshot was performed, which is preferably expressed as the time when the snapshot was completed (step 210).

Once backup server 100 is notified of the time of each of the snapshots performed on computing platforms 102, 104, and 106, backup server 100 then determines which of the snapshots of computing platforms 102, 104, and 106 was performed last in terms of the time when each snapshot was performed, where this time is now referred to as the snapshot synchronization time (SST), and notifies agent 108 of the SST (step 212). If for any reason agent 108 doesn't receive the SST from backup server 100, such as within a predefined amount of time after agent 108 notifies backup server 100 of the time when its snapshot was performed, agent 108 preferably instructs file system monitor 110 to release any data write requests that it intercepted, thereby allowing their data to be written to data storage 114—preferably only to locations to which data were not written as indicated in the snapshot—notifies backup server 100 that it is not participating in the synchronized snapshot as described below, and provides its snapshot information to backup server 100, whereupon steps 214-228 below are skipped. Otherwise, agent 108 instructs disk monitor 112 to intercept all requests on its computing platform to write data to data storage 114 (step 214). Agent 108 then instructs file system monitor 110 to release any data write requests that it intercepted prior to and including the SST (step 216). Disk monitor 112 intercepts the released data write requests (step 218), allows their data to be written to data storage 114—preferably only to locations to which data were not written as indicated in the snapshot—(step 220), records the data storage locations to which the data are written, and reports the locations to agent 108 (step 222). Agent 108 then instructs disk monitor 112 to stop intercepting data write requests (step 224). Agent 108 then instructs file system monitor 112 to release any remaining data write requests that it intercepted and then stop intercepting data write requests (step 226).

Agent 108 provides its snapshot information to backup server 100, as well as the locations to which data were written to data storage 114 after the time when the snapshot of data storage 114 was performed, where the requests to write the data were intercepted by file system monitor 112 prior to and including the SST (step 228). These locations to which data were written after the snapshot was performed, where the requests to write the data were intercepted prior to and including the SST, may be reported by agent 108 separate from the snapshot, or, alternatively, the snapshot itself may be updated to reflect this information.

Backup server 100 may, in accordance with conventional techniques, backup the data storage of any of computing platforms 102, 104, and 106 using their snapshots, together with the information regarding the locations to which data were written after any of the snapshots performed, where the requests to write the data were intercepted prior to and including the SST.

Figure 3:
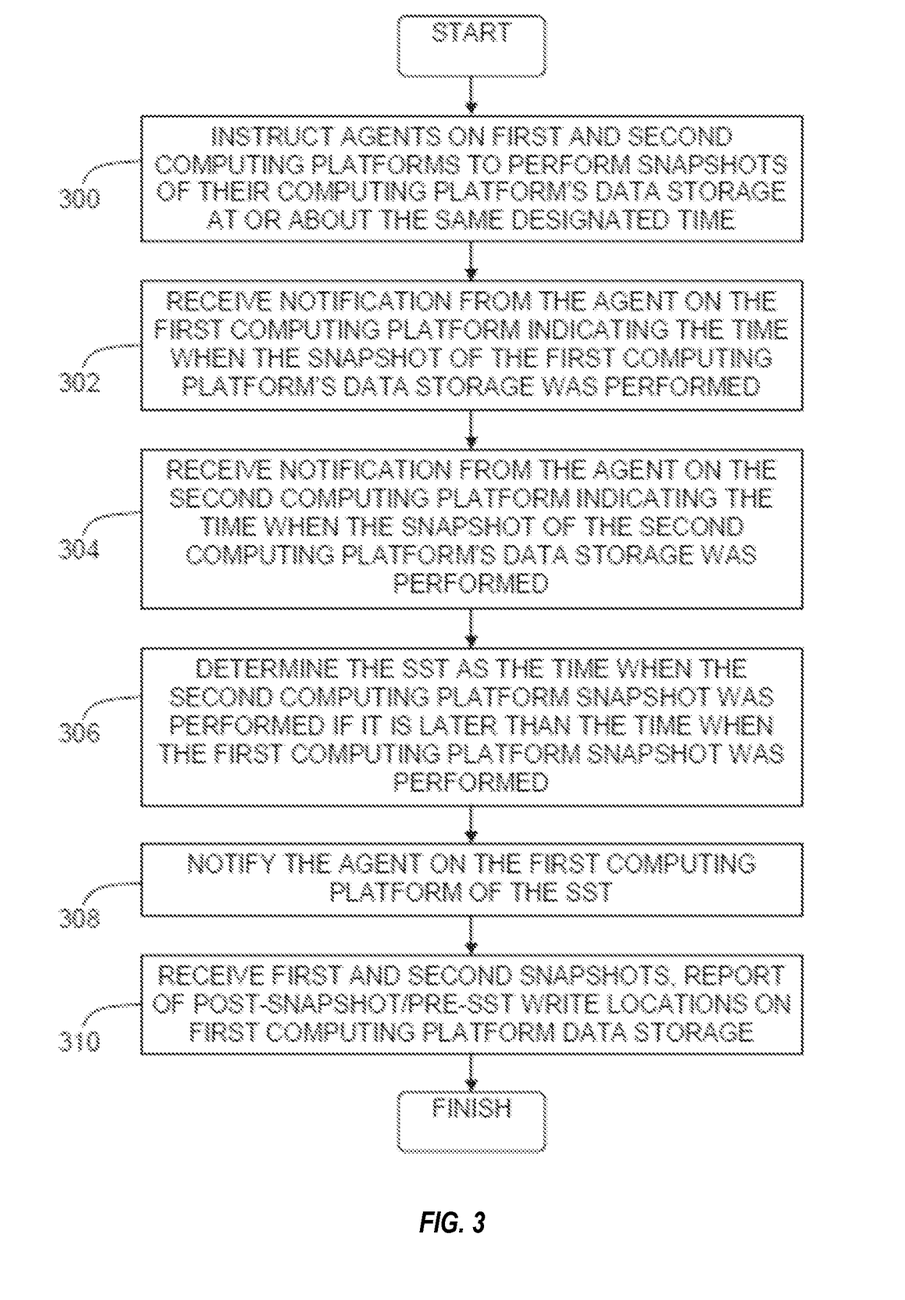
FIG. 3 is a simplified flowchart illustration of an exemplary method of operation of a backup server, operative in accordance with an embodiment of the invention.

Reference is now made to FIG. 3, which is a simplified flowchart illustration of an exemplary method of operation of a backup server, such as backup server 100 of the system of FIG. 1, operative in accordance with an embodiment of the invention. In the method of FIG. 3 an agent on a first computing platform and an agent on a second computing platform are instructed to perform snapshots of their computing platform's data storage at or about the same designated time (step 300). A notification is received from the agent on the first computing platform indicating the time when the snapshot of the first computing platform's data storage was performed (step 302). A notification is also received from the agent on the second computing platform indicating the time when the snapshot of the second computing platform's data storage was performed (step 304). The snapshot synchronization time (SST) is determined as the time when the snapshot of the second computing platform's data storage was performed if it is later than the time when the snapshot of the first computing platform's data storage was performed (step 306). The agent on the first computing platform is notified of the SST (step 308). In addition to receiving the snapshots of the first and second computing platforms from the agents, a report is received from the agent on the first computing platform regarding any location in the first computing platform's data storage to which data were written after the time when the snapshot of the first computing platform's data storage was performed and responsive to a write request that was made prior to or including the SST (step 310).

Figure 4:
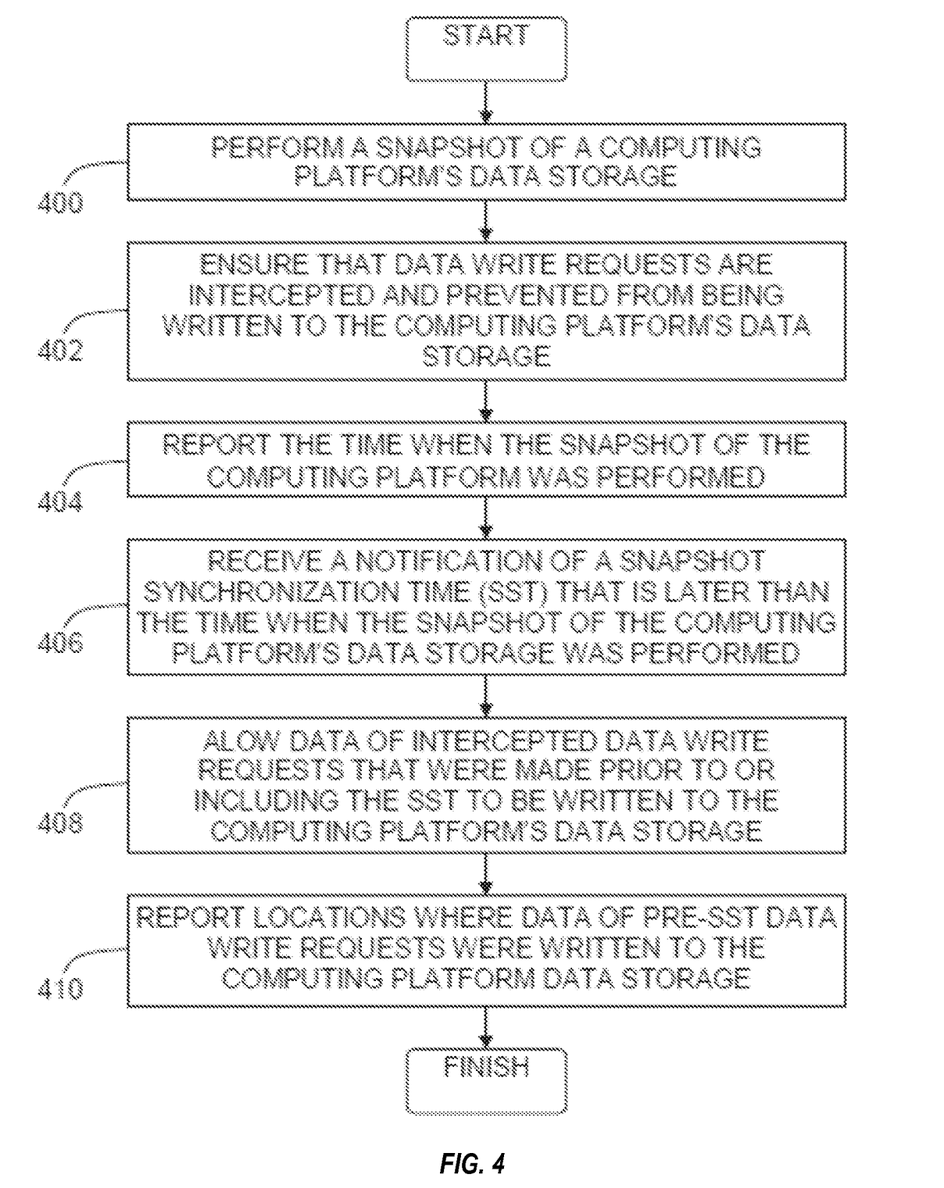
FIG. 4, which is a simplified flowchart illustration of an exemplary method of operation of an agent, operative in accordance with an embodiment of the invention.

Reference is now made to FIG. 4, which is a simplified flowchart illustration of an exemplary method of operation of an agent, such as agent 108 of the system of FIG. 1, operative in accordance with an embodiment of the invention. In the method of FIG. 4 a snapshot is performed of a computing platform's data storage (step 400) while ensuring that data write requests are intercepted and prevented from being written to the computing platform's data storage (step 402). The time when the snapshot was performed is reported to a backup server (step 404). A notification is received from the backup server of a snapshot synchronization time (SST) that is later than the time when the snapshot of the computing platform's data storage was performed (step 406). Data of intercepted data write requests that were made prior to or including the SST are allowed to be written to the computing platform's data storage (step 408), and their locations in the computing platform's data storage are reported to the backup server (step 410), either separately from the snapshot or by incorporating the location information into the snapshot.

Any of the elements described herein are preferably implemented in accordance with conventional techniques in computer software embodied in a non-transitory, computer-readable storage medium and/or in computer hardware.

Figure 5:
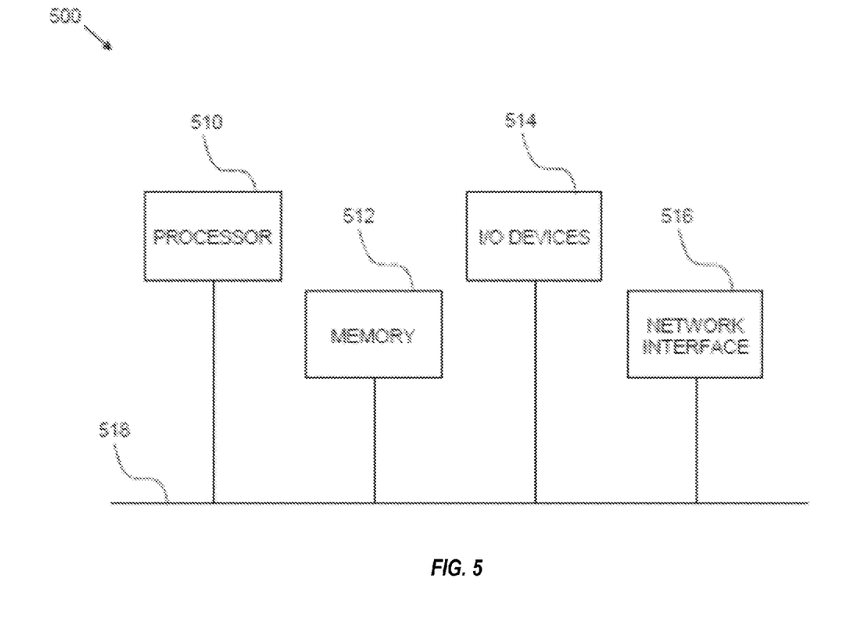
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the embodiments (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the embodiments of the invention has been described, the description is intended to be illustrative and is not to be construed as limiting the invention to the embodiments shown. It is appreciated that various modifications may occur to those skilled in the art that, while not specifically shown herein, are nevertheless within the true spirit and scope of the embodiments.

What is claimed is:

1. A method for coordinating point-in-time snapshots among multiple computing platforms, the method comprising:
    receiving a notification from an agent on a first computing platform indicating a time when a snapshot of the first computing platform's data storage was performed;
    receiving a notification from an agent on a second computing platform indicating a time when a snapshot of the second computing platform's data storage was performed;
    determining that the time when the snapshot of the second computing platform's data storage was performed is later than the time when the snapshot of the first computing platform's data storage was performed;
    notifying the agent on the first computing platform of the time when the snapshot of the second computing platform's data storage was performed; and
    receiving from the agent on the first computing platform a report of any location in the first computing platform's data storage to which data were written after the time when the snapshot of the first computing platform's data storage was performed and responsive to a write request that was made prior to or including the time when the snapshot of the second computing platform's data storage was performed.

2. The method according to claim 1 and further comprising instructing the agents to perform their snapshots at or about the same designated time.

3. The method according to claim 1 and further comprising receiving from the agent on the first computing platform the snapshot of the first computing platform's data storage; and
    performing a backup of the first computing platform's data storage, wherein the backup is performed using the snapshot of the first computing platform's data storage and the report of any location in the first computing platform's data storage to which data were written after the time when the snapshot of the first computing platform's data storage was performed and responsive to a write request that was made prior to or including the time when the snapshot of the second computing platform's data storage was performed.

4. The method according to claim 1 wherein the receiving, determining, and notifying are implemented in any of a) computer hardware, and b) computer software embodied in a non-transitory, computer-readable storage medium.

5. A method for coordinating point-in-time snapshots among multiple computing platforms, the method comprising:
    performing a snapshot of a first computing platform's data storage;
    reporting a time when the snapshot of the first computing platform's data storage was performed;
    receiving a notification indicating that a snapshot synchronization time that is later than the time when the snapshot of the first computing platform's data storage was performed, the snapshot synchronization time equaling the time when the snapshot of a second computing platform's data storage was performed; and
    reporting any location in the first computing platform's data storage to which data were written after the time when the snapshot of the first computing platform's data storage was performed and responsive to a write request to the first computing platform's data storage that was made prior to or including the snapshot synchronization time.

6. The method according to claim 5 and further comprising recording in the snapshot of the first computing platform's data storage any location in the first computing platform's data storage to which data were written after the time when the snapshot of the first computing platform's data storage was performed and responsive to a write request to the first computing platform's data storage that was made prior to or including the snapshot synchronization time.

7. The method according to claim 5 wherein the step of reporting the time when the snapshot of the first computing platform's data storage was performed comprises reporting the time when the snapshot of the first computing platform's data storage was completed.

8. The method according to claim 5 and further comprising:
    causing all requests to write data to the first computing platform's data storage to be intercepted by a first interceptor;
    causing the time of each intercepted request to be recorded; and
    preventing the data of each intercepted request from being written to the first computing platform's data storage, wherein the causing and preventing are performed prior to performing the snapshot of the first computing platform's data storage.

9. The method according to claim 8 and further comprising:
  causing all requests to write data to the first computing platform's data storage to be intercepted by a second interceptor;
  allowing the data of each request intercepted by the second interceptor to be written to the first computing platform's data storage at write locations;
  causing the write locations to be recorded; and
  causing the first interceptor to release each intercepted request that was intercepted prior to and including the snapshot synchronization time.

10. The method according to claim 1 wherein the performing, reporting, and receiving are implemented in any of a) computer hardware, and b) computer software embodied in a non-transitory, computer-readable storage medium.

11. A system for coordinating point-in-time snapshots among multiple computing platforms, the system comprising:
  an agent on a first computing platform;
  an agent on a second computing platform; and
  a backup server configured to receive a notification from an agent on a first computing platform indicating a time when a snapshot of the first computing platform's data storage was performed, receive a notification from an agent on a second computing platform indicating a time when a snapshot of the second computing platform's data storage was performed, determine that the time when the snapshot of the second computing platform's data storage was performed is later than the time when the snapshot of the first computing platform's data storage was performed, notify the agent on the first computing platform of the time when the snapshot of the second computing platform's data storage was performed, and receive from the agent on the first computing platform a report of any location in the first computing platform's data storage to which data were written after the time when the snapshot of the first computing platform's data storage was performed and responsive to a write request that was made prior to or including the time when the snapshot of the second computing platform's data storage was performed.

12. The system according to claim 11 wherein the backup server is configured to instruct the agents to perform their snapshots at or about the same designated time.

13. The system according to claim 11 wherein the backup server is configured to
  receive from the agent on the first computing platform the snapshot of the first computing platform's data storage; and
  perform a backup of the first computing platform's data storage, wherein the backup is performed using the snapshot of the first computing platform's data storage and the report of any location in the first computing platform's data storage to which data were written after the time when the snapshot of the first computing platform's data storage was performed and responsive to a write request that was made prior to or including the time when the snapshot of the second computing platform's data storage was performed.

14. The system according to claim 11 wherein the agents are configured to perform a snapshot of a computing platform's data storage, report a time when the snapshot was performed, receive a notification indicating that a snapshot synchronization time that is later than the time when the snapshot of the computing platform's data storage was performed, and report any location in the computing platform's data storage to which data were written after the time when the snapshot of the computing platform's data storage was performed and responsive to a write request that was made prior to or including the snapshot synchronization time.

15. The system according to claim 14 wherein the agents are configured to record in the snapshot of the computing platform's data storage any location in the computing platform's data storage to which data were written after the time when the snapshot of the computing platform's data storage was performed and responsive to a write request that was made prior to or including the snapshot synchronization time.

16. The system according to claim 14 wherein times when the snapshots were performed are the times when the snapshots were completed.

17. The system according to claim 14 wherein the agents are configured to cause all requests to write data to the computing platform's data storage to be intercepted by a file system monitor prior to performing the snapshot, cause the time of each intercepted request to be recorded by the file system monitor; and cause the file system monitor to prevent the data of each intercepted request from being written to the computing platform's data storage.

18. The system according to claim 17 wherein the agents are configured to cause all requests to write data to the computing platform's data storage to be intercepted by a disk monitor, cause the disk monitor to allow the data of each request intercepted by the second interceptor to be written to the computing platform's data storage at write locations, cause the write locations to be recorded, and cause the file system monitor to release each intercepted request that was intercepted prior to and including the snapshot synchronization time.

19. The system according to claim 11 wherein the backup server and the agents are implemented in any of a) computer hardware, and b) computer software embodied in a non-transitory, computer-readable storage medium.

* * * * *